United States Patent [19]

Boeren

[11] 3,950,679
[45] Apr. 13, 1976

[54] VARIABLE CAPACITOR

[75] Inventor: Johannes Carolus Adrianus Boeren, Tilburg, Netherlands

[73] Assignee: U.S. Philips Corporation, New York, N.Y.

[22] Filed: Nov. 20, 1974

[21] Appl. No.: 525,616

[30] Foreign Application Priority Data
Dec. 22, 1973 Netherlands ..................... 7317645

[52] U.S. Cl. ............................. 317/249 R; 317/250
[51] Int. Cl.² ......................................... H01G 5/04
[58] Field of Search ....................... 317/249 R, 250

[56] References Cited
FOREIGN PATENTS OR APPLICATIONS
364,431  1/1932  United Kingdom ............. 317/249 R
399,055  12/1922  Germany ......................... 317/249 R
560,963  7/1923  France ............................. 317/249 R Primary Examiner—E. A. Goldberg
Attorney, Agent, or Firm—Frank R. Trifari; Daniel R. McGlynn

[57]  ABSTRACT

A variable capacitor comprising a rotatable drum, which serves as an electrode, and a belt, which is circumferentially guided about the drum and an auxiliary drum, for supporting the counter-electrode layer. This layer is separated from the rotatable drum by a vapor-deposited dielectric layer.

11 Claims, 2 Drawing Figures

U.S. Patent April 13, 1976     3,950,679

VARIABLE CAPACITOR

The invention relates to a variable capacitor comprising two drums which are rotatable about parallel shafts, the cylindrical surface of the first drum being made of a conductive material over at least a part of the circumference and constituting a rotatable electrode, and an endless flexible belt being guided over the two drums, the belt supporting at least one metallic electrode layer which is separated from the rotatable electrode by a dielectric layer, it being possible to bring the metallic electrode layer more or less in a capacitive relationship with the rotatable electrode by rotation of the drums. A device of this kind is known, for example, from British Patent No. 364,431. The electrode on the belt comprises a connection, preferably in the form of a flexible supply lead.

It is the object of the invention to provide an inexpensive and practical embodiment of a capacitor having small dimensions. The capacitor according to the present invention provides a flexible belt having a supply lead consisting of a strip of synthetic material which included on the inner side a metal layer which extends as far as or near to one of the ends of the strip, fixation of the other end of the strip to a portion which is situated between the ends thereof producing an endless belt having a lead-out supporting a part of the metal layer serving as the supply lead.

Figure 1:
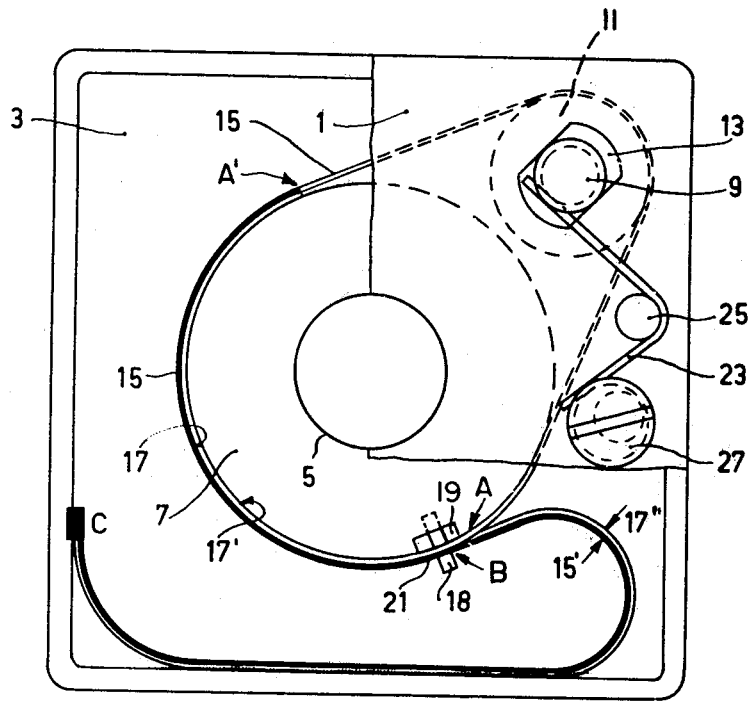
Figure 2:
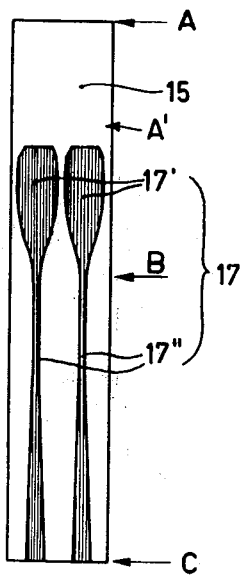

FIG. 1 shows an embodiment according to the invention in an axial front view, and FIG. 2 separately shows a portion thereof.

The variable capacitor shown in FIG. 1 comprises a frame which consists in known manner of two parallel plates 1 and 3, composed of a synthetic material, (shown to be broken away with the exception of the right-hand upper part). The plates 1 and 3 are connected to each other by a number of columns (not shown) or by some other manner. Journalled to be freely rotatable in the frame 1, 3 is the shaft 5 of a cylindrical metal drum 7, and the shaft 9 of a smaller insulating drum 11. Both drums are axially located between the plates 1 and 3, but shaft 9 is journalled to be radially movable in elongate openings 13.

Arranged circumferentially in part about the two drums 7 and 11 is a flexible loop or belt 15 composed of a synthetic material provided on its inner side (the side facing the drums 7 and 11) with a metallic electrode layer, i.e. a metal layer 17, consisting of two parts 17' and 17''. The belt 15 extends from a fixed point A on the drum 7, around the smaller insulating drum 11, then back circumferentially around drum 7, starting about at A', until the original point A is reached. The point on the belt 15 which overlaps the starting point A is designated point B. The belt then extends tangentially from the drum 7 and loops around frame until it is fixedly attached to the frame at point C. The part 17', having a length which preferably corresponds to half the circumference (or slightly more) of the drum 7, serves as the electrode which is indicated by the heavy line in FIG. 1. Between the drum 7 and the metal layer 17 on the belt 15 there is provided at least one very thin — for example, a thickness of 2– 20 microns — dielectric layer (omitted for the sake of clarity) which is preferably obtained by vapour-deposition of a suitable synthetic material such as para-xylene on the belt 15 or on the drum 7 or on both. The surfaces of the drum 7 and the metal layer part 17' constitute the electrodes of a capacitor having a capacitance which can be varied by rotation of the shaft 5 which may be connected to a connection terminal in the usual manner by way of a sliding contact. FIG. 1 shows the position for maximum capacitance, to which the shaft 5 has been turned in the counterclockwise direction. When the shaft 5 is now turned clockwise, the capacitance is reduced because the part of the belt 15 which supports the layer part 17' is gradually moved from the drum 7 in the direction of drum 11 and therefore is brought outside the capacitive relationship with the drum surface 7 existing in FIG. 1. The operation of the capacitor therefore depends on a limited rotation of the shaft 5.

The heavy black lines in FIG. 1 represent the metallic electrode layer 17 (consisting of portions 17' and 17'') present on the belt 15. The extent of this layer along both the length and width of the belt 15 is shown explicitly in FIG. 2.

FIG. 2 shows a plane view of the belt 15, in a reduced scale and in the unfolded condition, with the metal layer 17 provided thereon. In the present example the layer 17 consists of two elongated, extending narrow strips. Each of these strips consists of two portions 17' and 17''. The two parts 17' of each strip serve as electrodes for two separate, simultaneously variable capacitors.

The endless belt 15 is formed from a flexible strip of synthetic material (see FIG. 2) by bending one end thereof (denoted in FIG. 2 by arrow A) and by welding it or gluing it to the position B which is located between an endless A and C of the strip. The belt section situated between the arrows A and B constitutes the endless belt or loop, while the section BC constitutes a flexible "lead-out" 15' (FIG. 1). The latter supports a part of the metal layer 17 which consists of two narrow metal tracks 17''' which serve as a supply line to the layer parts 17' on the inner side of the endless belt 15, (belt section AB) which as noted above serve as the electrodes of the capacitor.

The belt is preferably tangentially secured on the drum 7, at the point A, B, for example, by means of a pin 18. In the drum 7 a recessed axial groove 19 is provided for receiving a thickened portion or ridge 21 of the belt which is formed during welding. A fixed relationship between the angle of rotation of the shaft 5 and the instantaneous value of the capacitance is thereby ensured. Due to the very small thickness of the dielectric layer or layers (not shown), a rotary capacitor having a maximum capacitance of, for example, 2 × 400 pF can be obtained for frame dimensions of only, for example, 20 × 20 × 25 nm.

The endless belt or loop 15 should obviously always be properly taut. A straight or curved wire spring is provided for this purpose on the front of the frame 1, and a similar spring on the rear of the frame 1 (not visible in FIG. 2). One end of each of the springs laterally presses against one end of the shaft 9 of the second drum 11, which is journalled to be radially slidable. The shaft 9 is therefore forced outward and away from the first drum 7 along the elongate opening 13. The loop 15 is therefore pulled between drum 7 and drum 11 until it is suitably taut. The tension of each of the wire springs is preferably separately adjustable by means of an eccentrically journalled disc; FIG. 1 shows how the curved wire spring 23 used in this embodiment is arranged about a raised portion 25 of the frame plate 1, its other end laterally bearing against an eccentrically journalled disc 27.

What is claimed is:

1. A variable capacitor comprising first and second drums, which are rotatable about substantially parallel shafts, the cylindrical surface of said first drum being composed of a conductive material over at least a part of the circumference and constituting a rotatable electrode; a flexible belt, having a first end, guided at least in part circumferentially over the two drums, said belt including at least one metallic electrode layer a dielectric layer situated between said metallic electrode layer and said rotatable electrode; and a supply lead having a metallic layer portion, connected to said belt on said first drum at a predetermined point, said belt and said supply lead comprising a continuous strip of synthetic material.

2. A variable capacitor as defined in claim 1, wherein said first end is fixedly secured to said first drum.

3. A variable capacitor as defined in claim 1, wherein said metallic layer portion of said supply lead extends to at least one of the ends of said lead.

4. A variable capacitor as defined in claim 1, wherein said metallic electrode layer of said belt is in capacitive relationship with said rotatable electrode.

5. A variable capacitor as defined in claim 1, wherein said metallic electrode layer is covered by a vapor-deposited insulating layer forming said dielectric layer.

6. A variable capacitor as defined in claim 1, wherein said rotatable electrode is covered by a vapor-deposited layer of synthetic material, forming said dielectric layer.

7. A variable capacitor comprising first and second drums, which are rotatable about substantially parallel shafts, the cylindrical surface of said first drum being composed of a conductive material over at least a part of the circumference and constituting a rotatable electrode; a flexible belt, having a first end, guided at least in part circumferentially over the two drums, said belt including at least one metallic electrode layer, a dielectric layer situated between said metallic electrode layer and said rotatable electrode; and a supply lead having a metallic layer portion, connected to said belt on said first drum at a predetermined point, wherein one end of said supply lead is fixedly secured to said first end of said belt on said first drum.

8. A variable capacitor comprising first and second drums, which are rotatable about substantially parallel shafts, the cylindrical surface of said first drum being composed of a conductive material over at least a part of the circumference and constituting a rotatable electrode; a flexible belt, having a first end, guided at least in part circumferentially over the two drums, said belt including at least one metallic electrode layer, a dielectric layer situated between said metallic electrode layer and said rotatable electrode; and a supply lead having a metallic layer portion, connected to said belt on said first drum at a predetermined point, wherein said second drum has an insulating surface, and is journalled to be radially slidable with respect to said first drum.

9. A variable capacitor as defined in claim 8, wherein said second drum has a shaft, and further comprising a spring for laterally engaging the ends of said shaft for keeping said belt taut around said first and second drums.

10. A variable capacitor as defined in claim 9, wherein said spring is a curved-wire spring, and further comprising a frame with eccentrically journalled discs located thereon for laterally engaging said spring and enabling the tension in said spring to be adjusted.

11. A variable capacitor as defined in claim 9, wherein said spring is a straight-wire spring.

* * * * *

UNITED STATES PATENT AND TRADEMARK OFFICE
CERTIFICATE OF CORRECTION

PATENT NO. : 3,950,679
DATED : April 13, 1976
INVENTOR(S) : JOHANNES CAROLUS ADRIANUS BOEREN It is certified that error appears in the above-identified patent and that said Letters Patent are hereby corrected as shown below:

Column 1, line 24, "included" should be --includes--

Column 2, line 31, "endless" should be --ends--
          line 32, "the" (last occurence) should be --an--
          lines 32-33, "endless" should be --"endless"--
          line 39, "capacitor" should be --capacitors--
          line 52, "endless" should be --"endless"--

Signed and Sealed this

Thirteenth Day of July 1976

[SEAL]

Attest:

RUTH C. MASON
*Attesting Officer*

C. MARSHALL DANN
*Commissioner of Patents and Trademarks*